United States Patent [19]
Stach

[11] Patent Number: 6,024,415
[45] Date of Patent: *Feb. 15, 2000

[54] WHEEL FOR A MOTOR VEHICLE AND METHOD OF MAKING SAME

[75] Inventor: Jens Stach, Eberdingen, Germany

[73] Assignee: Dr. Ing. h.c.F. Porsche AG, Weissach, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/706,266

[22] Filed: Sep. 4, 1996

[30] Foreign Application Priority Data

Oct. 11, 1995 [DE] Germany ............... 195 37 839

[51] Int. Cl.$^7$ ................................................. B60B 3/08
[52] U.S. Cl. ................................. 301/64.2; 301/65
[58] Field of Search .................... 301/63.1, 64.1, 301/64.2, 65, 95, 96, 97, 98, 104, 105.1

[56] References Cited

U.S. PATENT DOCUMENTS

| | | | |
|---|---|---|---|
| 1,602,512 | 10/1926 | Walther et al. ...................... | 301/64.2 |
| 1,610,023 | 12/1926 | Meldrum .................................. | 301/65 |
| 1,613,127 | 1/1927 | Reyneri ................................. | 301/64.2 |
| 1,684,552 | 9/1928 | Meldrum .................................. | 301/65 |
| 1,828,340 | 10/1931 | Reed ................................ | 301/64.2 X |
| 2,105,317 | 1/1938 | Frank .................................. | 301/65 X |
| 4,610,482 | 9/1986 | Overbeck et al. .................... | 301/63.1 |
| 5,538,329 | 7/1996 | Stach ....................................... | 301/65 |
| 5,575,539 | 11/1996 | Stach ....................................... | 301/65 |

FOREIGN PATENT DOCUMENTS

| | | |
|---|---|---|
| 23 11 740 B2 | 9/1974 | Germany . |
| 3258202 | 10/1988 | Japan ................................. 301/63.1 |

Primary Examiner—Russell D. Stormer
Attorney, Agent, or Firm—Evenson McKeown Edwards & Lenahan, PLLC

[57] ABSTRACT

A wheel for a motor vehicle has a rim spider provided with air openings and is connected with a rim well. The wheel comprises at least two shell parts which are constructed as a rim well and a rim spider and assembled and which each have an interior wall and an exterior wall. In the area of the air openings, these are connected with one another and each form hollow spokes between one another which, on respective end sides, lead into concentric annuli of the wheel.

26 Claims, 8 Drawing Sheets

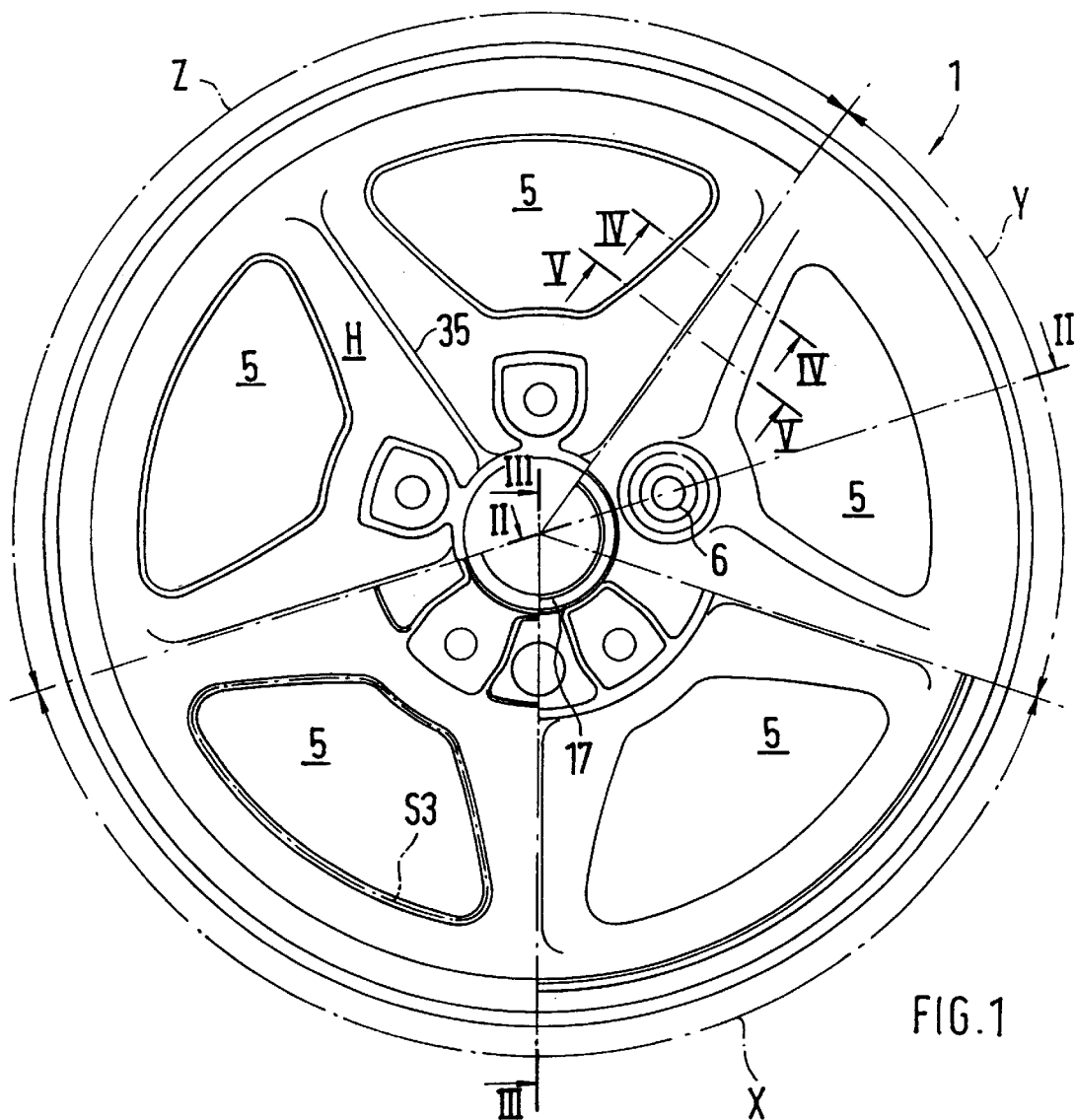
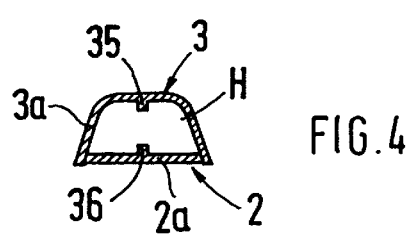
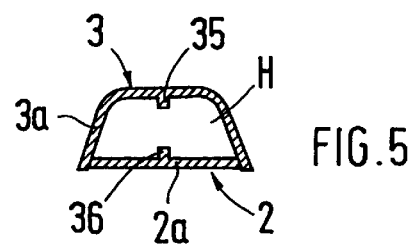

WHEEL FOR A MOTOR VEHICLE AND METHOD OF MAKING SAME

BACKGROUND AND SUMMARY OF THE INVENTION

This invention relates to a wheel for a motor vehicle having a rim spider with air openings and having a rim well connected with the rim spider, and a method of making such a wheel.

From German Patent Document DE 23 11 740, a vehicle wheel is known which consists of a ribbed rim spider which is provided with air openings, which is arranged inside a rim well which has both rim flanges. The rim spider is welded several times to the rim well on the inside and consists of a light-metal casting, the rim well being made of a light-metal sheet. Furthermore, vehicle wheels are known from U.S. Pat. No. 4,610,482 which are constructed in two parts, the rim well being connected on the inside of the rim spider in the area of the rim flange by means of welding.

It is an object of the present invention to provide a multi-part vehicle wheel which can be manufactured in a simple manner, which has a high stability while its weight is low, and which is constructed such that it can be connected in a simple manner and different connection processes can be used.

This object has been achieved according to the present invention by providing a wheel for a motor vehicle comprising at least two shell parts which form a rim spider, and a rim well connected with the rim spider, each of the rim spider and the rim well defining air openings, said at least two shell parts being connected with one another by at least one connection to form an axially inner wall, an axially outer wall, a plurality of hollow spokes which extend generally radially between adjacent of said air openings and which extend between at least one radially outer annulus and at least one radially inner annulus.

According to another preferred embodiment, a wheel for a motor vehicle is provided with a rim spider defining a plurality of air openings and with a rim well connected with the rim spider, wherein the wheel comprises at least two shell parts forming the rim well and the rim spider which each have an interior wall and an exterior wall, said shell parts forming a plurality of hollow spokes radially extending from adjacent air openings and defining an exterior annulus and an interior annulus, wherein said shell parts are connected with one another by means of at least one of welded connection and a threaded connection, According to another preferred embodiment, a method for producing a wheel is provided comprising the steps of: forming a first shell part into a rim spider with an exterior ring web, boundary walls defining air openings and cylindrical receiving devices for wheel fastening bolts; forming a second shell part into a rim well with an exterior ring web, opening edges for air openings and pot-shaped bearings and a hub sleeve, subsequently assembling said first and second shell parts into a centered assembly by means of the mutually engaging portions, such that the edges of the of the wall sections in the rim spider rest on the interior edges of the air openings of the rim well, the hub sleeve is arranged in the exterior hub ring, the ring webs of the rim spider and of the rim well are situated directly opposite one another with their faces, and subsequently welding the mutually engaging portions of the two shell parts to connect the shell parts with one another.

The principal advantages achieved of the present invention are that the rim spider and the rim well each consist of one shell part which can be connected to one another in an assembled manner and hollow spokes are formed between the air openings of the shell parts. The shell parts may be manufactured separately from one another by different processes and from various materials so that, corresponding to the demands on the wheel, the material and the manufacturing process as well as the connecting process, for example, a welding process, can be freely selected.

The shell parts are each constructed with areas which supplement one another; that is, when the two shell parts are fitted together for being connected, these areas may act as so-called centerings with respect to one another. Thus, the rim spider has air openings which are formed by inwardly aligned boundary walls which, in the fitted-together condition of the shell parts, project into air openings of the rim well and can be connected to the opening edges of these air openings, in which case this may take place by way of a welding or a gluing process.

Furthermore, when the shell parts of the rim spider are fitted together with the rim well, cylindrical receiving devices of the rim spider are arranged in the pot-shaped bearings of the rim well. In addition, the exterior ring of the hub of the rim spider is held on the hub sleeve of the rim well. In the meeting exterior ring area of the two shell parts, a so-called continuous hump surface is formed by means of the ring webs on both rim parts.

The connecting of the two shell parts for forming the finished wheel takes place by means of a connection, by welding, gluing or processes with the same effect, preferably between the two ring webs, between the hub sleeve of the rim well and the exterior ring of the hub of the rim spider. In addition, another connection may take place between the boundary walls of the air openings in the rim spider with the opening edges in the rim well, which is usually the case.

According to one advantageous embodiment, the hub rings of the shell parts of the rim spider and of the rim well are fitted into one another for the connection so that an optimal centering of the two shell parts is ensured for the connection. Either the hub rings overlap completely so that a connection, for example, a welded connection, takes place on the interior supporting surface of the rim well or the interior hub ring ends approximately in the center of the exterior hub ring and the welded connection is then situated inside the exterior hub ring.

For the special design of the rim spokes and of the exterior annulus of the rim formed as a function thereof, the connection between ring webs of the rim well and of the rim spider can be designed in a variable manner, whereby a free-standing edge in an approximate Z-shape or in an approximate angular shape is obtained so that a well base rim can be produced which is distinguished by deep-lying rim spokes.

By means of the shell parts, particularly on the basis of the inwardly directed boundary walls of the air openings in connection with the opening edges of the air openings of the rim well, stability-increasing hollow spokes are formed between the air openings, which hollow spokes, in each case, lead on the end side into concentric annuli of the wheel and, in addition, these also have a stability-increasing effect. On the one hand, these annuli are formed between the upper boundary walls of the air openings and the ring webs as well as the lower boundary walls of the air openings around the hub sleeve.

Radially extending ribs, which have a stiffening effect, may be molded on inside the hollow spokes and are provided in the shell part of the rim spider as well as in the shell part of the rim well. The ribs arranged in the hollow spokes are preferably situated opposite one another and are constructed as half-ribs. Preferably they are arranged at a distance from one another in the center plane of the hollow spoke. The shell parts may be made of various materials, for example, of an aluminum alloy, a magnesium alloy or a titanium alloy, in which case the individual shell parts can be combined in the various materials. It is also possible to construct the shell parts of sheet metal, in the die-casting process or of a cast rolled material. A connection of the two shell parts may be carried out by means of a welding process, such as a fusion welding, a laser welding or an electron beam welding or by means of a gluing process.

These and other objects, features and advantages of the present invention will become more readily apparent from the following detailed description when taken in conjunction with the accompanying drawings.

BRIEF DESCRIPTION OF THE DRAWINGS

FIG. 1 is an axial view of a vehicle wheel assembled of two shell parts according to a preferred embodiment of the present invention;

FIGS. 4 and 5 are sectional views according to Line IV—IV and V—V of FIG. 1 of a hollow spoke of the assembled shell parts;

DETAILED DESCRIPTION OF THE DRAWINGS

Figures 2, 3:
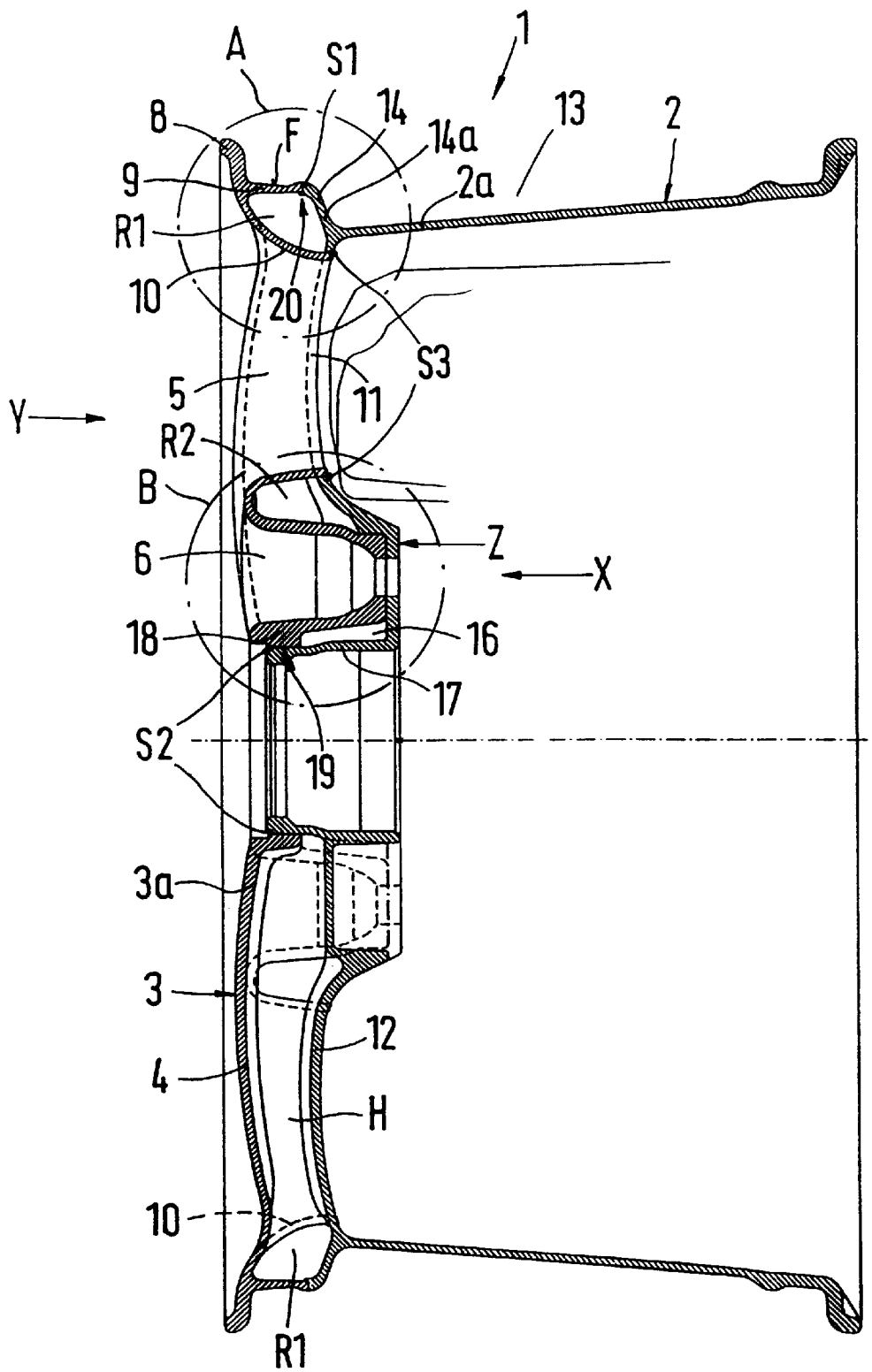
FIG. 2 is a sectional view according to Line II—II of FIG. 1.
FIG. 3 is a sectional view according to Line III—III of FIG. 1.
Figure 6:
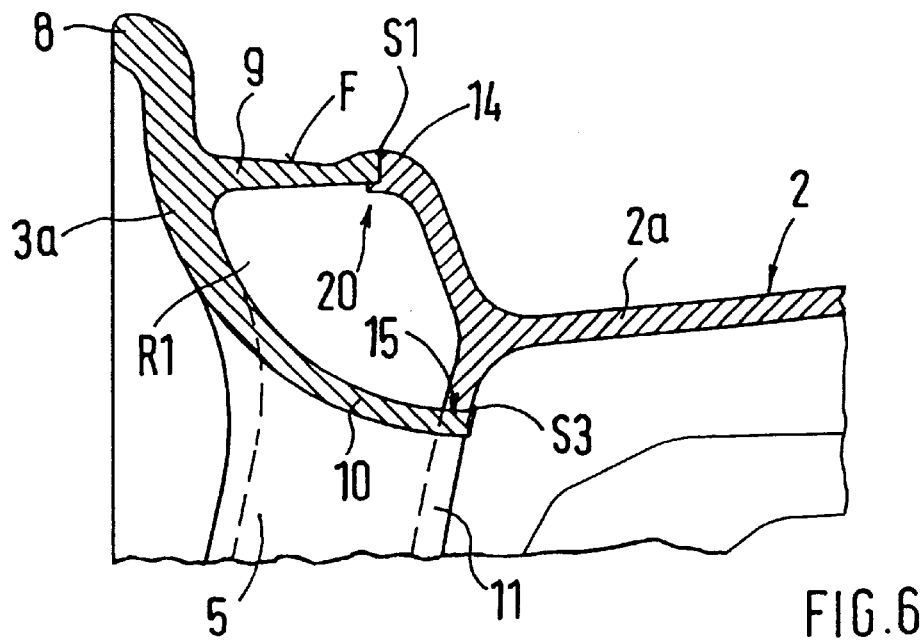
FIG. 6 is an enlarged representation of detail A according to FIG. 2.
Figure 7:
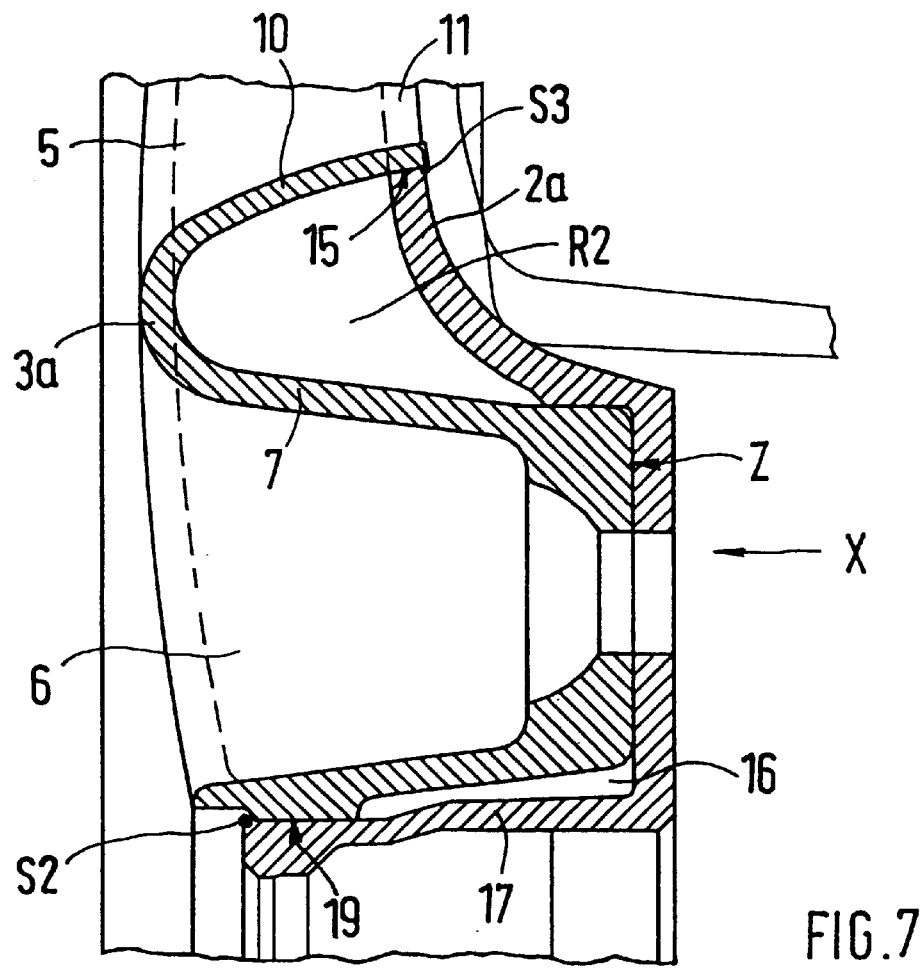
FIG. 7 is an enlarged representation of detail B according to FIG. 2.

The wheel 1 consists essentially of two shell parts 2, 3 which form the rim well 2a and the rim spider 3a. These shell parts 2, 3 are produced separately, are assembled and are undetachably connected with one another of a connection, for example by welding or by gluing at connections S1, S2 and/or S3.

The rim spider 3a forms the exterior part of the wheel 1 and comprises an axially outer wall 4 (exterior wall arrangement) in which air openings 5 and cylindrical receiving devices or bolt holes 6 for wheel fastening bolts (not shown) are provided which are arranged around a hub sleeve 17.

The exterior edge of the rim spider 3a is formed by a rim flange 8 which is adjoined by a ring web 9 which extends into the interior of the rim and is part of a hump surface F.

For forming air ducts, the air openings 5 in the rim spider 3a have inwardly bent boundary walls 10 which project into adjacent air openings 11 of the rim well 2a. These boundary walls 10 form hollow spokes H between the air openings 5 and 11, which hollow spokes H lead on the end side into concentric annuli R1 and R2 of the wheel 1.

The rim well 2a is formed of an axially inner wall 12 (interior wall arrangement) with a recessed, offset well surface 13 which extends approximately at a right angle with respect to this wall. This well 13, by way of an upright molding-on, is adjoined by a front-side ring web 14 which is situated opposite the ring web 9 of the rim spider 3a for the connection. In the interior wall 12, the air openings 5 are provided which have opening edges 15 situated or set up in the interior wall. Adjoining the air openings 11 in the wheel center direction, cylindrical receiving devices 6 of the rim spider 3a are arranged which correspond to the pot-shaped bearings 16 in the interior wall 12. In the assembled condition of the shell parts 2, 3, a hub sleeve 17 of the rim well 2a is arranged in an exterior hub ring 18 of the rim spider 3a and is inserted into a ring area 19 by means of a so-called sliding fit or a press fit.

By way of mutually engaging portions of the two shell parts 2, 3 of the rim well 2a and of the rim spider 3a, such as the ring webs 9, 14, the boundary walls 10 with the opening edges 15, the cylindrical receiving devices 6 with the pot-shaped bearings 16 as well as the exterior hub ring 18 with the hub sleeve 17, a certain centering or precentering of the shell parts 2, 3 with respect to one another is achieved so that subsequently the connections of the two shell parts can be carried out.

The boundary walls 10 of the air openings 5 of the rim spider 3a are constructed to be directed into the wheel interior in a curved manner and rest preferably on the interior side of the opening edges 15 of the air openings 11 in the rim well 2a. It is also possible for the faces of the boundary walls 10 to abut from the outside against surfaces of the interior wall 12 of the air openings 11, or the opening edges 15 to be tilted to the outside and three faces will then be situated opposite the faces of the boundary walls, for example, for the welded connection.

Figure 9:
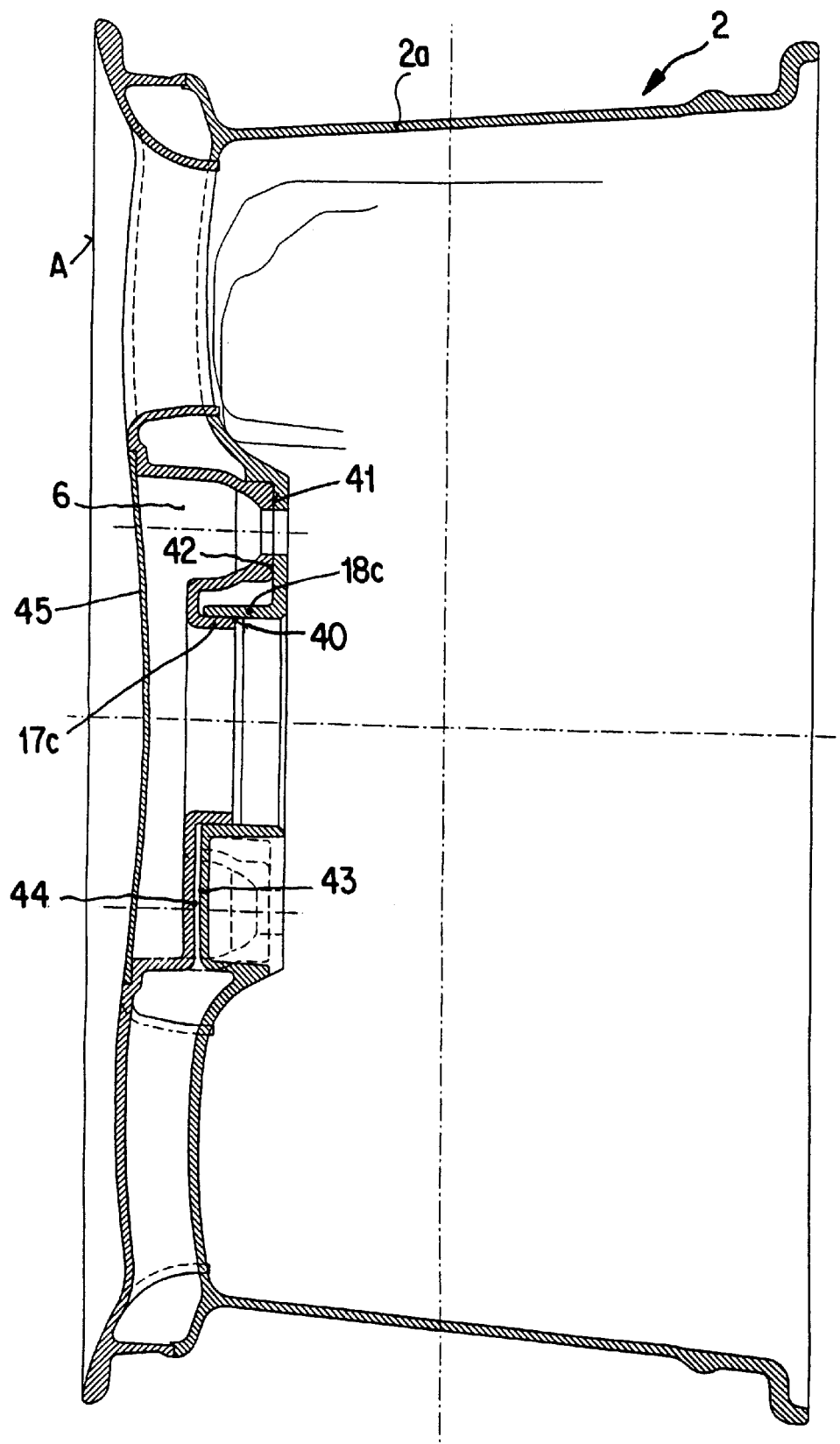
FIG. 9 is a sectional view of another embodiment of a vehicle wheel with hub rings of the shell parts which are partially fitted into one another.
Figure 10:
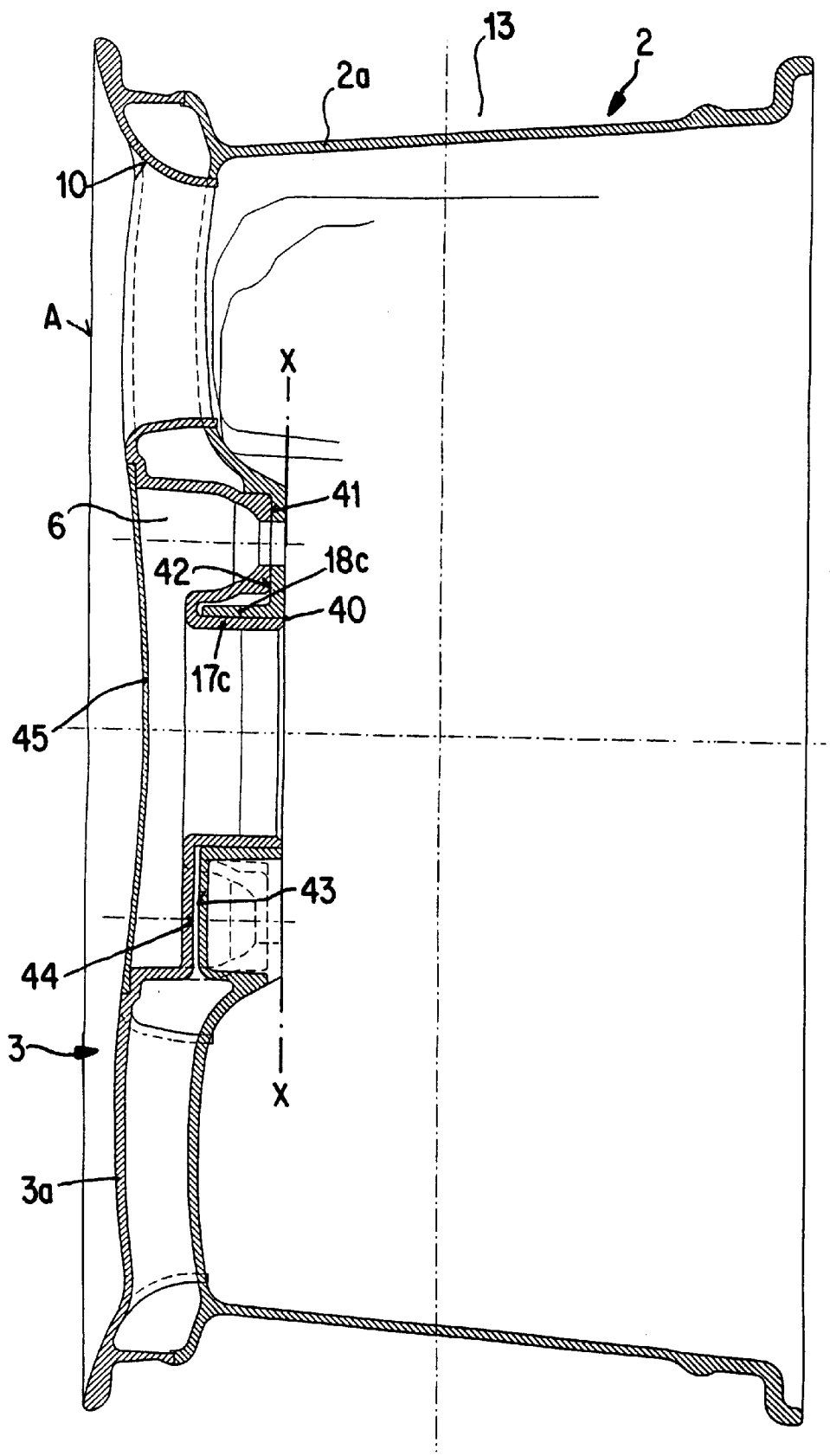
FIG. 10 is a sectional view of an embodiment according to FIG. 9 with hub rings of the two shell parts which are continuously fitted into one another.

FIGS. 9 and 10 illustrate further embodiments of wheels 1 whose two shell parts 2, 3 each have hub rings 17c, 18c. These are fitted into one another for the connection. According to FIG. 9, the interior hub ring 17c of the shell part 3a is partially fitted into the exterior hub ring 18c of the shell part 2a; that is, the interior hub ring 17 ends approximately in the center of the exterior hub ring 18c and the connection point 40 is situated in the exterior hub ring 18c.

According to FIG. 10, the hub rings 17c, 18c are arranged in a covered manner; that is, the interior hub ring 17c is fitted into the exterior hub ring 18c to such an extent that the connection 40 is situated in the supporting plane X—X of the rim well 2 or of the shell part 2a.

The centers of the two shell parts 2, 3 are supported, on the one hand, on opposite joint supporting surfaces 41, 42 in the area of the receiving device 6 for the wheel fastening bolts and, on the other hand, on opposite supporting surfaces 43, 44 between these receiving devices 6. The wheel fastening bolts or the whole center of the wheel with the cylindrical receiving devices 6 is closed off by a cover 45.

Figure 11:
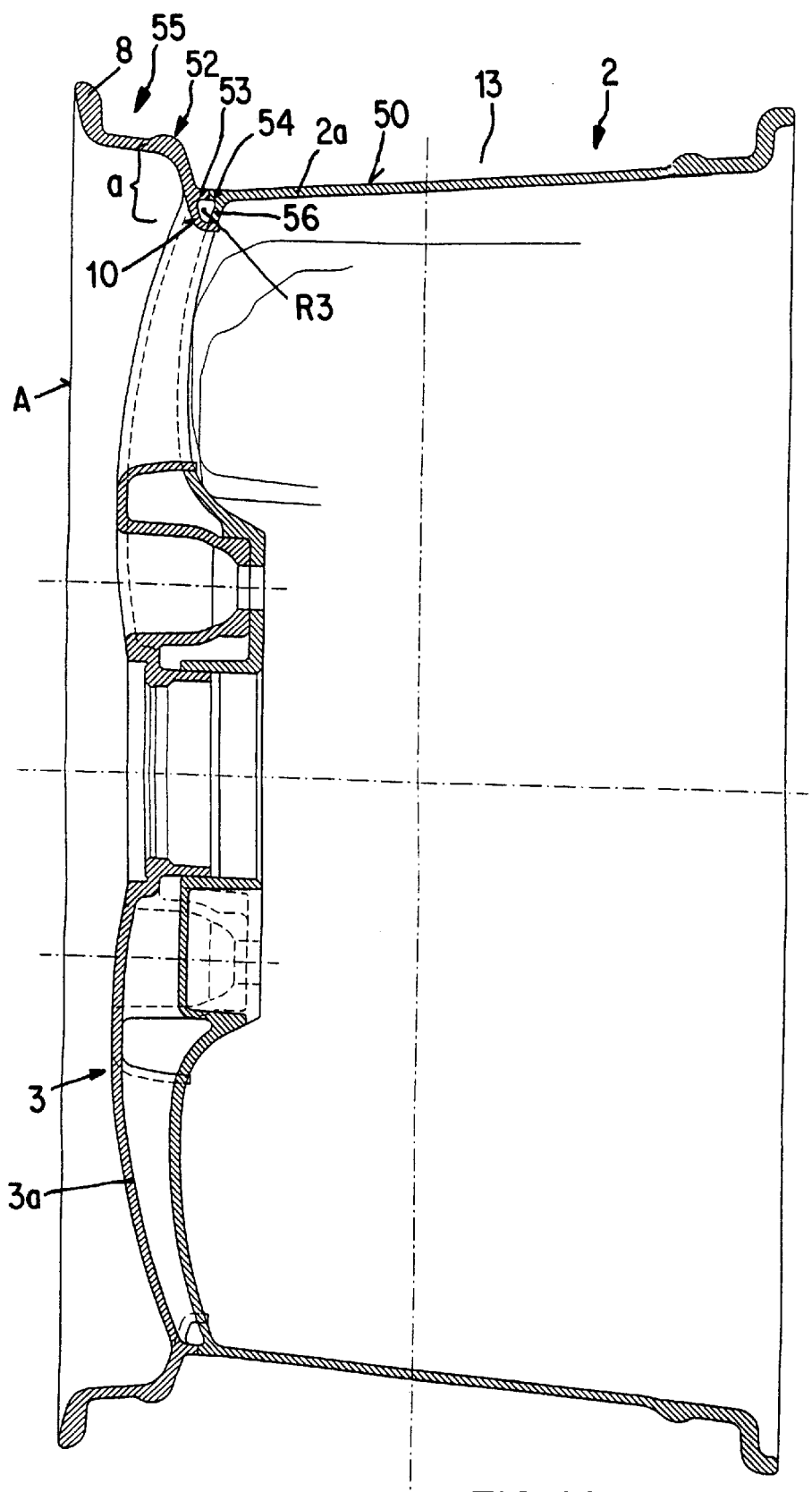
FIG. 11 is a view of an embodiment according to FIG. 9 with an exterior annulus arranged below the rim well surface and a Z-shaped free-standing rim edge and deeper-lying hollow spokes.
Figure 12:
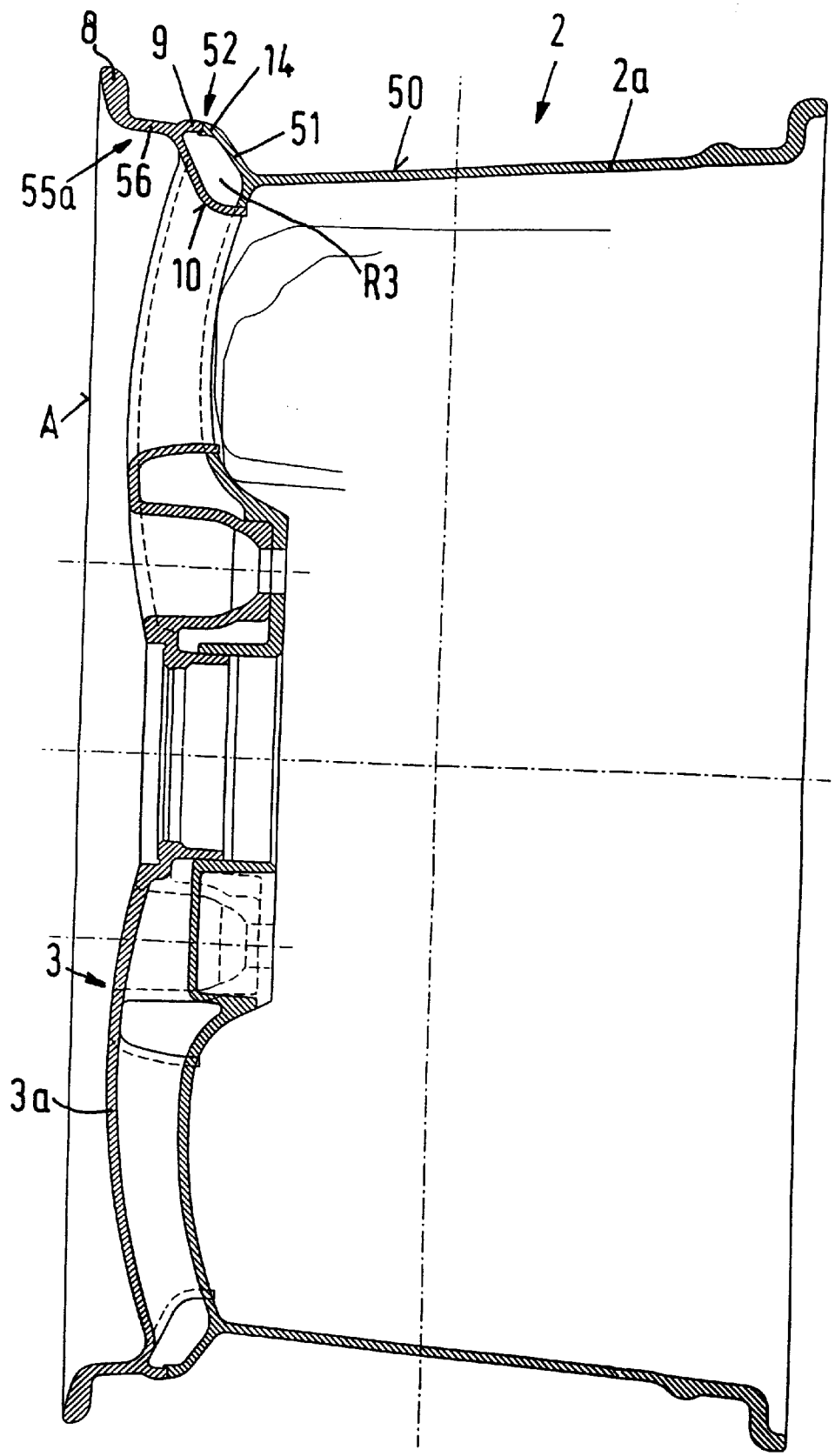
FIG. 12 is a view of an embodiment according to FIG. 9 with an angularly constructed, freestanding rim edge adjoining the exterior annulus and with deeper-lying hollow spokes.

FIGS. 11 and 12 illustrate so-called well base rims in the case of which the spokes H with respect to the exterior plane A of the wheel 1 are situated lower than in the case of the embodiments according to FIGS. 9 and 10.

According to the embodiment of FIG. 11, the exterior annulus R3 is bounded on the exterior side by the boundary wall 10 and on the interior side by ring webs 53, 54 as well as an interior wall 55 of the hollow spoke H. The ring webs 53, 54 extend as an extension of the well surface 50. The annulus R3 is situated by the extent a away from the edge 55 below the rim bed surface 50 so that the free-standing edge 55 is obtained which has a generally Z-shaped design. The hump 52 has no connection point.

In FIG. 12, the corresponding free-standing edge 55a has an approximately angular design, in which case the annulus R3 adjoins a leg 56 of the edge 55a.

After the two shell parts 2, 3 are fitted together, they are connected with one another, for example, by welding or gluing connections S1, S2, S3. Welding or gluing at connection S1 takes place between the two ring webs 9 and 14. For a better alignment with respect to one another, one of the ring webs 9 or 14 may have an angular receiving profile 20. In the illustrated embodiment, the ring web 14 has this angular receiving profile 20. Welding or gluing at connection S2 takes place between the hub sleeve 17 and the exterior hub ring 18 in the ring area 19. Furthermore, welding or gluing at connection S3 is provided between the boundary walls 10 of the air openings 5 and the opening edges 15 of the air openings 11 in the rim well. These welded or glued connections at connection S3 may be made as alternatives to the other connections S1 and S2.

By means of the welded or glued connection at connection S3 of the two shell parts 2 and 3 in the area of the air openings 5 and 11, closed hollow spokes H are obtained which each extend between adjoining air openings and which, on respective end sides, lead into the annuli R1 and R2. This results in a hollow-spoke wheel formed by two assembled shell bodies 2, 3, the curving of the hollow spokes H being independently selectable. Within the hollow spokes, radially extending ribs 35, 36 may be arranged which are preferably arranged in the center plane of the hollow spokes, are situated opposite one another and preferably define a free space between one another. The rib faces may also be situated directly adjoining one another.

The welding of the undetachable connecting of the two shell parts 2 and 3 for producing the wheel 1 may be carried out as a fusion welding, a laser welding or as an electron beam welding. Furthermore, instead of welding, a corresponding adhesive bonding of the shell parts 2, 3 to one another, for example, by way of a two-component gluing, is possible.

The material of the shell parts 2, 3 may optionally consist of a sheet metal material, a material produced by die-casting or of a cast rolled material. Optionally, material alloys for the shell parts are conceivable which are made of an aluminum alloy, a magnesium alloy or a titanium alloy.

Figure 8:
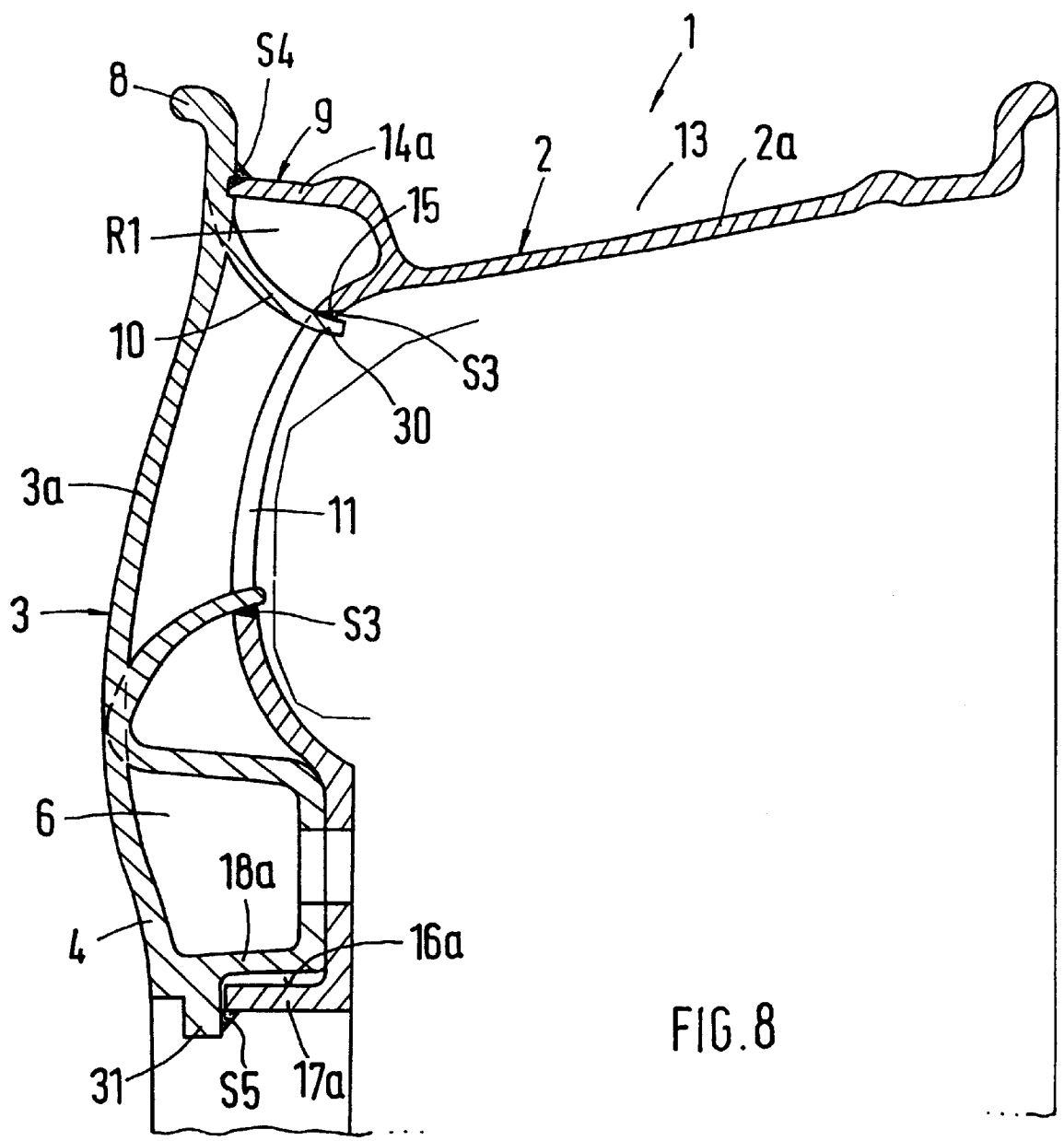
FIG. 8 is a sectional view of two shell parts of another embodiment of the wheel according to the present invention.

A further embodiment according to FIG. 8 shows two shell parts 2, 3 for forming the rim spider 3a and the rim well 2a. The ring web 14a of the rim well 2a is constructed to extend to the exterior wall 14 of the rim spider 3a in an abutting manner. A welding or gluing at connection S4 takes place on the interior (axially inward) surface of the exterior wall 3. The boundary walls are fitted through the openings 11 in a protruding manner. These protruding ends 30 are welded to the opening edges 15. The rim well 2a has a pot-shaped bearing 16a in which the cylindrical receiving device 18a is arranged. An edge of the sleeve 17a projects from the inside against a ring collar 31 and is connected with the latter by means of welding or gluing at connection S5.

In another embodiment of the wheel 1, instead of the welded or glued connection S2 and S3, at least one threaded connection, such as a bolt or a screw, may also be used. The boundary walls 10 or the opening edges are in this case designed with such a threaded connection. A threaded connection is also contemplated in the area of the connection S2 or S5.

A process for manufacturing the wheel is preferably carried out according to the following steps:

In a first operation, the shell parts are produced to form a rim spider with an exterior rim web, boundary walls for the air openings and cylindrical receiving devices for wheel fastening screws and a rim well with an exterior rim web, opening edges, such as the air opening, and pot-shaped bearings and a hub sleeve. Subsequently, a centered assembly of the two shell parts takes place by way of mutually engaging and corresponding shell sections for aligning the connection, in which case the edges of the wall sections of the rim spider rest on the interior edges of the air openings of the rim well, the hub sleeve is arranged in the exterior hub ring, and the ring webs of the rim spider and of the rim well are situated directly facing one another. Subsequently, one connection by welding or gluing respectively for connecting the two shell parts for producing a wheel is carried out on these directly adjoining and facing areas of the shell parts. When the shell parts are glued to one another, the surfaces which are in contact are provided with a bonding agent and are connected, in which case the fastening connections S1 to S5 may be replaced by gluing.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A wheel for a motor vehicle, comprising:
   first and second shell parts connected together to form a hub, a rim well, and a plurality of hollow spokes extending between said hub and said rim well, adjacent of said hollow spokes and said rim well defining respective air openings therebetween,
   said first shell part comprising axially outer wall portions of said hollow spokes,
   said second shell part comprising axially inner wall portions of said hollow spokes,
   said first shell part being connected with said second shell part at a first connection proximate said hub, at a second connection proximate said rim well, and at a third connection proximate said air openings,
   wherein said first connection is located at or adjacent an annular engagement between a radially outward-facing annular surface of one of said shell parts and a corresponding radially inward-facing annular surface of the other of said shell parts.

2. A wheel according to claim 1, wherein said second connection is located at or adjacent an annular engagement between an axially inward-facing annular surface of said first shell part and a corresponding axially outward-facing annular surface of said second shell part.

3. A wheel according to claim 1, wherein said first shell part further comprises an outer flange which defines an axially outer portion of said rim well.

4. A wheel according to claim 3, wherein said first shell part has a curved cross-section extending radially and axially inwardly from said outer flange adjacent said air openings.

5. A wheel according to claim 1, wherein said first shell part and said second shell part define an annulus located adjacent said rim well at radially outer ends of said hollow spokes, said annulus communicating with an interior of said hollow spokes.

6. A wheel according to claim 5, wherein said first shell part and said second shell part define an annulus located between said hub and said rim well at radially inner ends of said hollow spokes, said annulus communicating with an interior of said hollow spokes.

7. A wheel according to claim 1, wherein said first shell part and said second shell part define an annulus located between said hub and said rim well at radially inner ends of said hollow spokes, said annulus communicating with an interior of said hollow spokes.

8. A wheel according to claim 1, wherein said first shell part further defines a plurality of cylindrical receiving holes located radially outside of said hub.

9. A wheel according to claim 1, wherein portions of said first shell part which define said air openings have a curved cross-section.

10. A wheel according to claim 1, wherein said shell parts are made from sheet metal, by die-casting or by cast rolling.

11. A wheel according to claim 1, wherein said shell parts are produced from one of an aluminum alloy, a magnesium alloy, and a titanium alloy.

12. A wheel according to claim 1, wherein said shell parts are connected together via one of a welding process, a fusion welding process, a laser welding process, and an electron beam welding process.

13. A wheel according to claim 1, wherein the shell parts of the wheel are adhesively connected together.

14. A wheel according to claim 1, wherein said hub is formed at least partially by said second shell part.

15. A wheel according to claim 1, wherein said hub is formed at least partially by said first shell part.

16. A wheel for a motor vehicle, comprising:
   a first one-piece shell part connected with a second one-piece shell part, said first and second shell parts forming a hub, a rim well, and a plurality of hollow spokes extending between said hub and said rim well, adjacent of said hollow spokes and said rim well defining respective air openings therebetween,
   said first shell part comprising axially outer wall portions of said hollow spokes,
   said second shell part comprising axially inner wall portions of said hollow spokes,
   said first shell part engaging said second shell part at a first location proximate said hub, at a second location proximate said rim well, and at a third location proximate said air openings,
   wherein said first location is an annular engagement between a radially outward-facing annular surface of one of said shell parts and a corresponding radially inward-facing annular surface of the other of said shell parts.

17. A wheel according to claim 16, wherein said first shell part is connected to said second shell part at or adjacent at least two of said first location, said second location, and said third location.

18. A wheel according to claim 16, wherein said second location is defined by mating annular surfaces of said first shell part and said second shell part.

19. A wheel according to claim 16, wherein said hub is formed at least partially by said second shell part.

20. A wheel according to claim 16, wherein said hub is formed at least partially by said first shell part.

21. A wheel for a motor vehicle having a plurality of hollow spokes, comprising:
   a first one-piece shell part comprising an essentially cylindrical portion forming a rim well, and a plurality of axially inner hollow spoke wall portions extending generally radially inwardly from said rim well toward a hub coaxial with said cylindrical portion; and
   a second one-piece shell part comprising an annular flange defining an axially outer portion of said rim well, and a plurality of axially outer hollow spoke wall portions extending generally radially inwardly from said flange toward said hub, said axially outer hollow spoke wall portions abutting said axially inner hollow spoke wall portions to form hollow spokes, adjacent of said hollow spokes defining air openings therebetween,
   said first shell part being connected with said second shell part via an annular connection proximate said hub, said annular connection being at or adjacent an annular engagement between a radially outward-facing annular surface of one of said shell parts and a corresponding radially inward-facing annular surface of the other of said shell parts.

22. A wheel according to claim 21, wherein said first shell part is connected with said second shell part via an annular connection proximate said rim well, said annular connection being at or adjacent mating annular surfaces of said first shell part and said second shell part.

23. A wheel according to claim 22, wherein said first shell part is connected with said second shell part at or adjacent said axially outer hollow spoke wall portions abutting said axially inner hollow spoke wall portions.

24. A wheel according to claim 21, wherein said first shell part is connected with said second shell part at or adjacent said axially outer hollow spoke wall portions abutting said axially inner hollow spoke wall portions.

25. A wheel according to claim 21, wherein said hub is formed at least partially by said second shell part.

26. A wheel according to claim 21, wherein said hub is formed at least partially by said first shell part.

* * * * *